(12) United States Patent
Cloots et al.

(10) Patent No.: US 12,076,924 B2
(45) Date of Patent: Sep. 3, 2024

(54) LOADING AN ADDITIVE MANUFACTURING SYSTEM WITH OPPOSITE SIDE ACCESS

(71) Applicant: UNITED GRINDING GROUP MANAGEMENT AG, Bern (CH)

(72) Inventors: Michael Cloots, St. Gallen (CH); Pascal Brunner, Hosenruck (CH); Kai Gutknecht, Uznach (CH); Florian Wirth, St. Gallen (CH); Philipp Lauber, Egnach (CH); Alex Frauchiger, St. Gallen (CH); Stenli Karanxha, Salmsach (CH)

(73) Assignee: United Grinding Group Management AG, Bern (CH)

( * ) Notice: Subject to any disclaimer, the term of this patent is extended or adjusted under 35 U.S.C. 154(b) by 0 days.

(21) Appl. No.: 17/946,136

(22) Filed: Sep. 16, 2022

(65) Prior Publication Data
US 2023/0078977 A1    Mar. 16, 2023

(30) Foreign Application Priority Data

Sep. 16, 2021 (EP) .................................... 21197231

(51) Int. Cl.
*B29C 64/25* (2017.01)
*B29C 64/259* (2017.01)
(Continued)

(52) U.S. Cl.
CPC ............ *B29C 64/25* (2017.08); *B29C 64/259* (2017.08); *B29C 64/295* (2017.08); *B29C 64/35* (2017.08);
(Continued)

(58) Field of Classification Search
CPC ..................................................... B29C 64/259
See application file for complete search history.

(56) References Cited

U.S. PATENT DOCUMENTS 6,554,600 B1 * 4/2003 Hofmann ................ B29C 41/34
425/182
11,014,294 B2 * 5/2021 Herzog .................... B22F 12/88
(Continued)

FOREIGN PATENT DOCUMENTS

DE  102004057865 A1 * 6/2006 ........... B29C 64/153
DE  102006014835 A1   10/2007
(Continued)

OTHER PUBLICATIONS

Extended European Search Report with translation filed in European Application No. 21197231.0, filed in Mar. 28, 2022. 18 pages.
(Continued)

*Primary Examiner* — Xiao S Zhao
*Assistant Examiner* — Nicholas J Chidiac
(74) *Attorney, Agent, or Firm* — Meunier Carlin & Curfman LLC

(57) ABSTRACT

The present invention relates to an additive manufacturing system and an additive manufacturing method. The additive manufacturing system includes an operator area, a loading area, and a transportable container unit. The operator area is configured to control the manufacturing system. The loading area is configured for loading the manufacturing system. The operator area is accessible from a first side of the manufacturing system and the loading area is accessible from a second side of the manufacturing system, wherein the first side is different from the second side. The transportable container unit is insertable into the loading area. The transportable container unit includes a powder storage container and a building container. The powder storage container is configured to store powder, and the building container is configured to additively manufacture a workpiece.

13 Claims, 11 Drawing Sheets

(51) Int. Cl.
    *B29C 64/295*     (2017.01)
    *B29C 64/35*     (2017.01)
    *B29C 64/371*     (2017.01)
    *B29C 64/386*     (2017.01)
    *B33Y 30/00*     (2015.01)
    *B33Y 40/00*     (2020.01)
    *B33Y 50/00*     (2015.01)

(52) U.S. Cl.
    CPC .......... *B29C 64/371* (2017.08); *B29C 64/386* (2017.08); *B33Y 30/00* (2014.12); *B33Y 40/00* (2014.12); *B33Y 50/00* (2014.12)

(56) References Cited

U.S. PATENT DOCUMENTS

| | | | |
|---|---|---|---|
| 11,338,513 B2* | 5/2022 | Hofmann | B23K 26/34 |
| 2011/0168091 A1 | 7/2011 | Baumann et al. | |
| 2018/0133800 A1 | 5/2018 | Pieger et al. | |
| 2018/0133966 A1 | 5/2018 | Plachner | |
| 2019/0054686 A1* | 2/2019 | Herzog | B22F 12/80 |
| 2020/0147879 A1* | 5/2020 | Hofmann | B22F 12/80 |
| 2020/0254526 A1 | 8/2020 | Huber et al. | |

FOREIGN PATENT DOCUMENTS

| | | |
|---|---|---|
| EP | 2926927 A2 | 10/2015 |
| EP | 3632592 A1 * | 4/2020 |

OTHER PUBLICATIONS

F . . . et al. "Sisma unveiled new PBF and CLP solutions", Nov. 26, 2019 (Nov. 26, 2019), Seiten 1-7, CP055902617, Gefunden im Internet: URL: https://www.3dnatives.com/en/sisma-pbf-dip-solutions-261120195/#! [gefunden am Mar. 17, 2022].

Office Action issued on Apr. 28, 2023, in European Patent Application No. 21197231.0.

Office Action issued on Sep. 27, 2023, in European Patent Application No. 21197231.0.

* cited by examiner

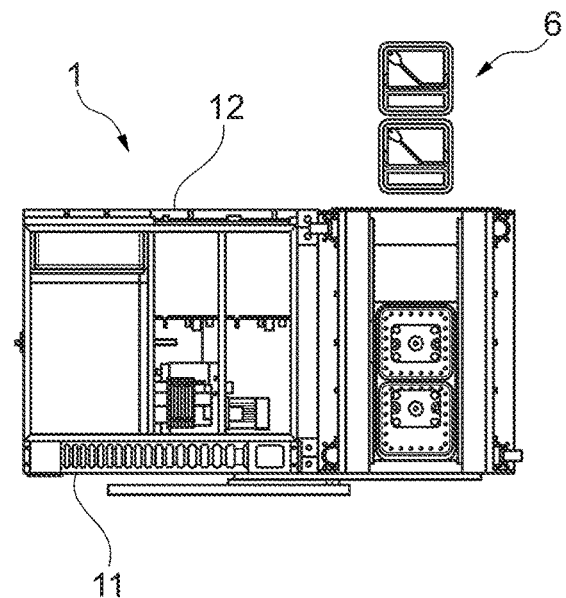
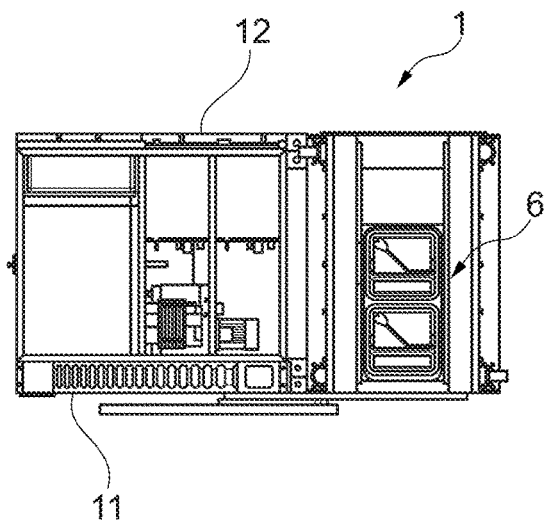
Fig. 4a  Fig. 4b
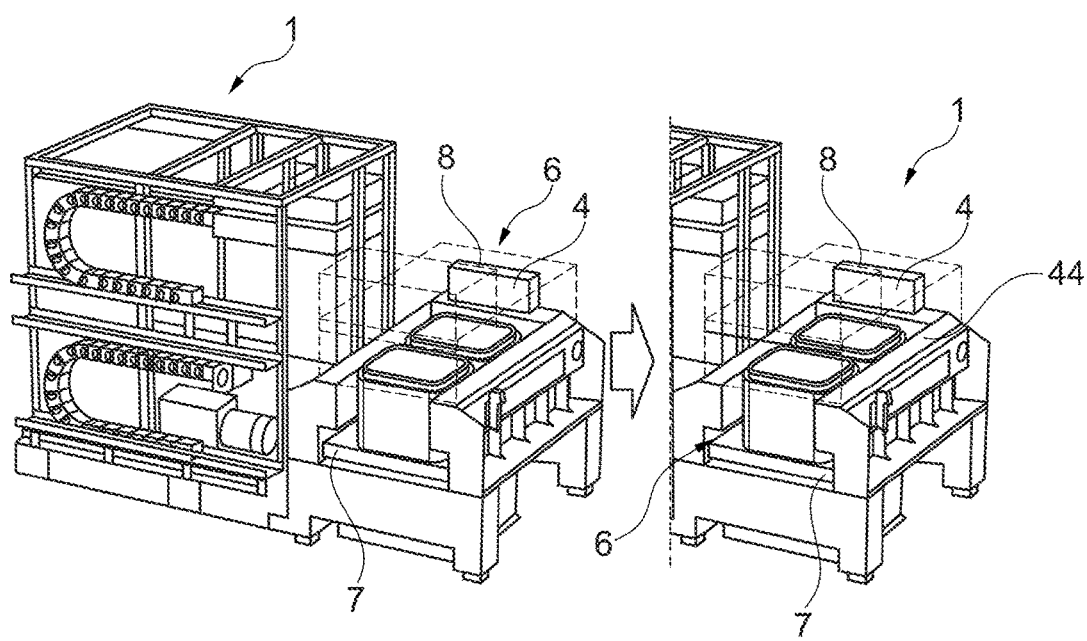
Fig. 5a  Fig. 5b

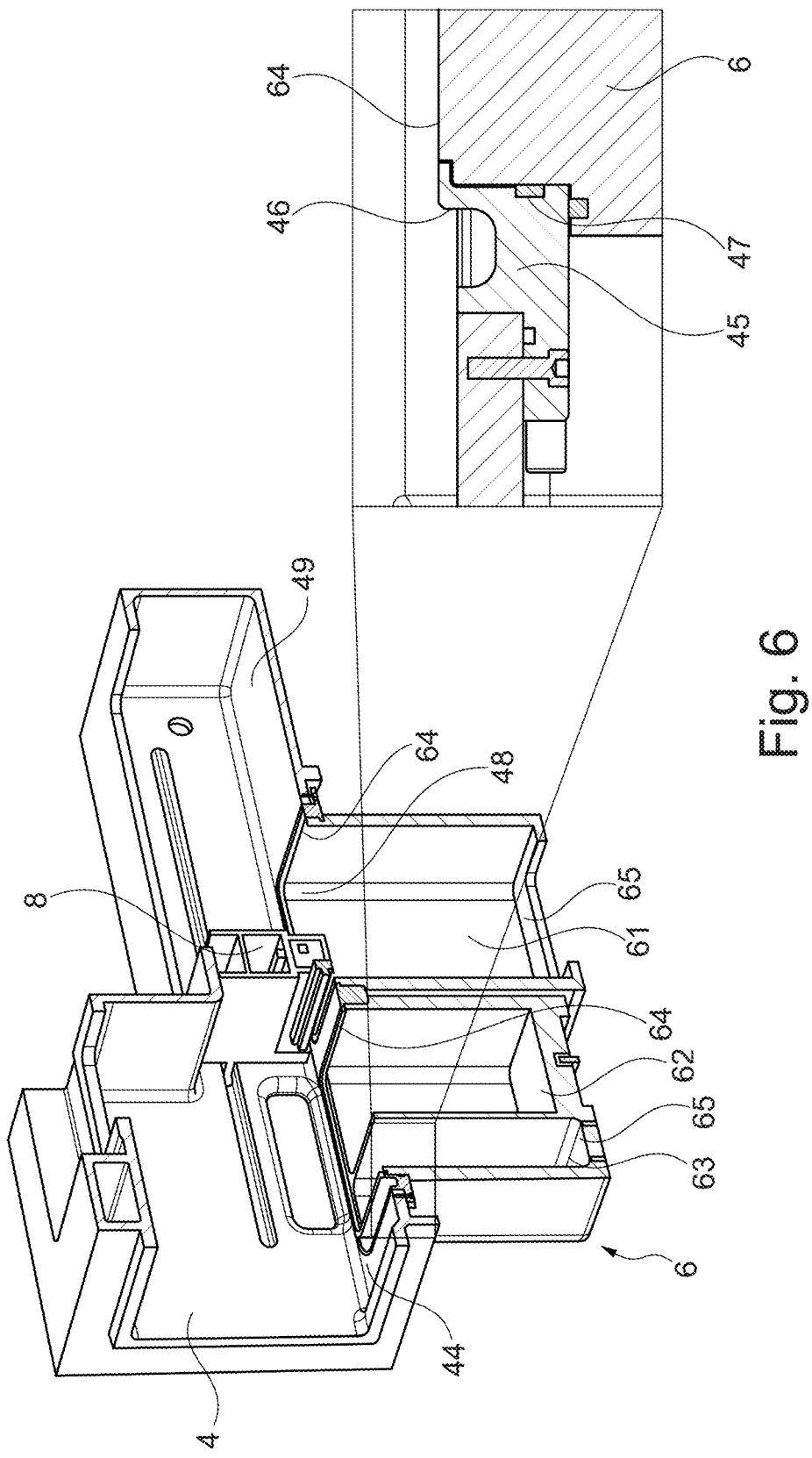

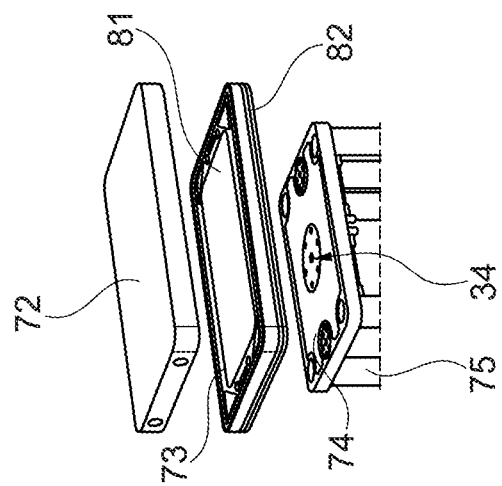
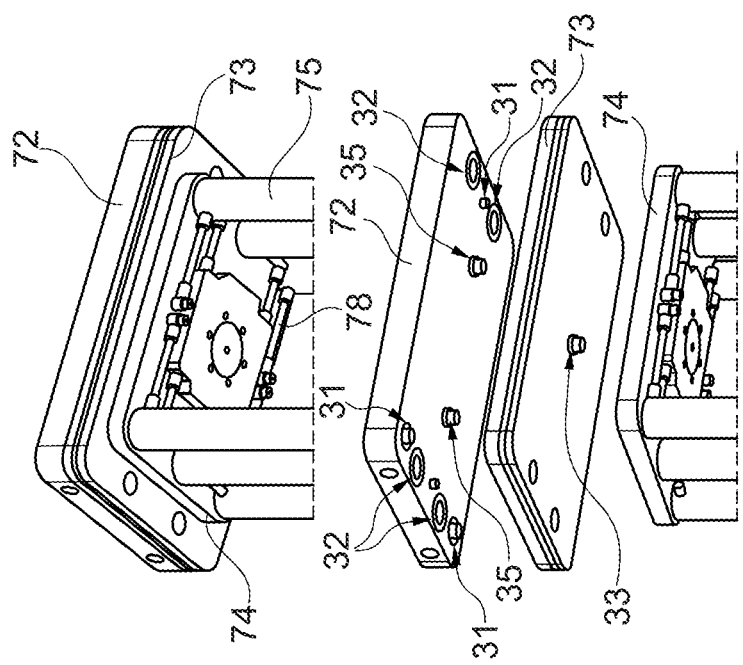
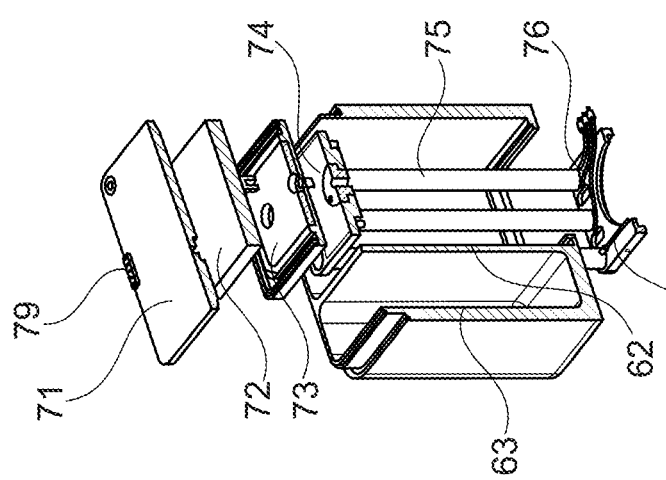

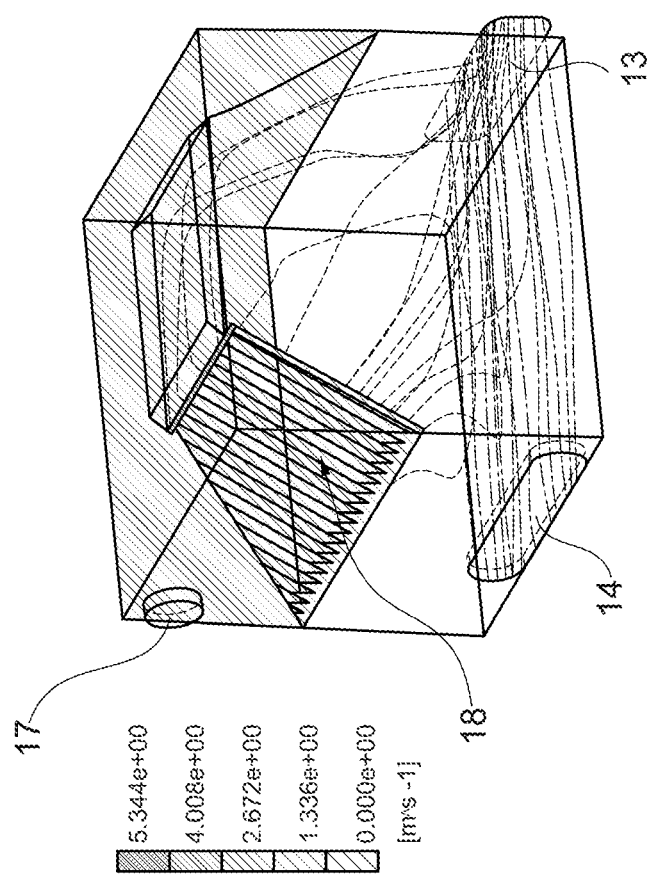
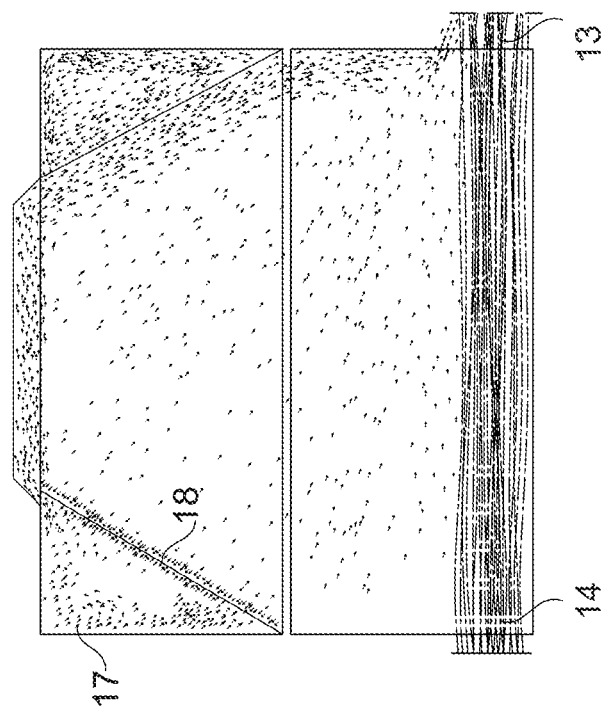
Fig. 13

LOADING AN ADDITIVE MANUFACTURING SYSTEM WITH OPPOSITE SIDE ACCESS

CROSS REFERENCE TO RELATED APPLICATIONS

This application is a United States National Phase Patent Application which claims the benefit of priority to EP Application No. 21197231.0, filed Sep. 16, 2021, which is incorporated by reference herein in its entirety.

TECHNICAL FIELD

The present invention relates to an additive manufacturing system and an additive manufacturing method.

BACKGROUND OF THE INVENTION

Additive manufacturing, in particular selective laser melting (SLM) or laser powder bed fusion (LPBF), is a generative manufacturing process that belongs to the group of beam fusion processes. In selective laser melting, the material to be processed is deposited in powder form in a thin layer on a base plate. The powdered material is completely remelted locally by means of laser radiation and forms a solid material layer after solidification. The base plate is then lowered by the amount of a layer thickness and powder is applied again. This cycle is repeated until all layers have been remelted. The finished part is cleaned of excess powder and machined according to need or used immediately.

Conventional machines for additive manufacturing are often simple in design, so they lack robustness and accuracy compared to precision machine tooling. In addition, such machine requires time-consuming setup and preparation. For example, in most cases, a powder material change requires a very time-consuming cleaning of all powder-contaminated components and assemblies before the machine can be filled with fresh powder.

In addition, the powder must be manually removed from a construction area of the machine using protective devices such as a dust mask or gloves. During this maintenance work, the system is not productive and costly laser and optics units are not available due to the manual intervention and work. The productivity of the conventional additive manufacturing system is thus limited.

SUMMARY OF THE INVENTION

It is therefore an object of the present invention to provide an improved additive manufacturing system that increases the productivity of additive manufacturing.

This object is solved by the additive manufacturing system and the additive manufacturing method according to the independent claims. Advantageous embodiments and further embodiments can be found in the dependent claims and in the following description.

The present invention comprises an additive manufacturing system comprising an operator area, a loading area and a transportable container unit. The operator area is configured for controlling the manufacturing system. The loading area is configured for loading the manufacturing system. The operator area is accessible from a first side of the manufacturing system and the loading area is accessible from a second side of the manufacturing system, wherein the first side is different from the second side. The transportable container unit is insertable into the loading area. The transportable container unit includes a powder storage container and a building container. The powder storage container is configured to store powder, and the building container is configured to additively manufacture a workpiece.

The advantage of the additive manufacturing system according to the invention is that the additive manufacturing process can be guaranteed to run smoothly, thus increasing the productivity of the additive manufacturing process. By separating the operator area and the loading area, contamination-free additive manufacturing and complete automation of additive manufacturing can be realized without having to provide personal protective equipment. Thus, operator safety and system safety can also be ensured.

The additive manufacturing system may be designed to produce the workpiece by a selective laser melting (SLM) or laser powder bed fusion (LPBF) process of a powder material. The additive manufacturing system may be a large-scale system divided into multiple areas, such as operator area, loading area, manufacturing area, peripheral area, and so on. The areas may be configured so that they do not overlap. In other words, the areas may be spatially separated from each other within the additive manufacturing system so that an operation at the operator area and an operation at the loading area do not cross each other.

At the operator area, the additive manufacturing system can be controlled. That is, the operator area may include at least one control device so that operating conditions or operating parameters for the additive manufacturing system can be set. Further, the operator area may provide an operator with access into the manufacturing system. The operator may be a human or an automated system such as robotic arm. Maintenance tasks, such as cleaning, repair, etc., can be performed through the access. The operator area may be located at a front of the manufacturing system.

The loading area may be configured so that the powder can be loaded into and/or unloaded from the manufacturing system through the loading area. The powder may be loaded and unloaded as powder by itself or in a powder storage container. The loading area can be located at a different location in the manufacturing system than the operator area. The loading area may be located perpendicular or opposite relative to the operator area. Thus, the loading area may be located at a rear or lateral side of the manufacturing system.

The container unit, which includes at least the powder storage container and the building container, may be configured to be portable. In other words, the container unit can be inserted into and/or removed from the loading area of the manufacturing system from the outside. The powder storage container and the building container can be connected together and loaded into the loading area together as a single unit. Alternatively, the powder storage container and the building container can be designed separately, so that they can be inserted into and removed from the manufacturing system independently of each other. The container unit can be transported and positioned either manually or automatically.

The building container can include a powder overflow designed to collect excess powder from the coating process.

The powder storage container may be designed to store freshly prepared powder that is layered toward the building container during additive manufacturing. Additive manufacturing, in other words selective melting, can take place in the building container by selectively melting the layered powder by a laser beam. After repeated application of the powder and selective melting, the workpiece can finally be generated.

In this way, a spatial and functional separation of the operator area and the loading area can be realized, which can lead to contamination-free or contamination-free additive manufacturing of the workpiece. "Contamination-free" can be understood to mean that the operator is not contaminated by powder and/or that the powder is not contaminated by the ambient atmosphere. Lids may be used as needed, for example, which are removed from the containers only after the entry of the containers into the manufacturing system.

In one embodiment, the container unit further comprises a powder overflow container. The powder overflow container may be configured to collect the residual powder left over after the selective melting process. Additionally, the powder overflow container can be configured to collect weld spatter that has occurred during additive manufacturing. The powder overflow container can be connected to the powder storage container and/or the building container, or it can be designed separately. Like the powder storage container and the building container, the powder overflow container can be designed to be transportable.

The fresh powder can be applied, for example, from a surface of the powder storage container to a surface of the building container in layers by means of a doctor blade. After the selective melting of the applied powder, the excess powder can be pushed into the powder overflow container by means of the squeegee. In other words, the powder storage container, the building container, and the powder overflow container may be arranged in this order in the container unit to allow powder to be transported by the squeegee in one direction.

In one embodiment, the powder storage container and the building container each include a base plate and a lifting rod. The lifting rod is configured to lift the base plate within the respective container. The base plate of the powder storage container and the building container may each be configured to seal an interior of the respective container to the exterior.

Each base plate may be connected to a lifting rod to move the base plate vertically within the respective container. Preferably, the lifting rod of the powder storage container can lift the base plate upward, so that the freshly prepared powder can be provided without gaps on the surface of the powder storage container. Meanwhile, the base plate of the building container can be gradually lowered downward by the lifting rod after each melting operation or exposure of the laser beam, to allow the following melting operation of the reapplied powder.

In one embodiment, the powder overflow container may also include a base plate and a lifting rod to facilitate emptying of the powder overflow container in which the residual powder and/or weld spatter is collected.

In one embodiment, the building container has a heating plate and a building panel. The heating plate is disposed between the building panel and the base panel, wherein the heating plate is configured to heat the building panel. The building panel may serve to receive the layered fresh powder and allow the selective melting of the powder therein. Heating the building panel may reduce a stress on the generated workpiece by reducing a temperature gradient between the generated material layers of the workpiece.

In one embodiment, the building panel may be disposed on the heating plate using a three-point support system. For example, three stud elements may be arranged on an underside of the building panel facing the heating plate and may rest on the heating plate. The bolt elements can protrude from the underside of the building panel in the direction of the heating plate and can each be spaced as far apart as possible from one another. In this way, a loose but secure three-point support of the building panel can be realized. In addition, the underside of the building panel can have at least one dowel pin by means of which, for example, the building panel can be fixed to the heating plate during post-treatment of the building panel.

In one embodiment, a through hole may be provided in respective corners of the heating plate. A fastening bolt, which extends from the bottom of the building container through the heating panel into the building panel without contact, can be inserted through the through hole. This fastening bolt may serve to clamp or lock the building panel at a lowest position within the building container.

Additionally, a bolt element for a zero-point clamping system may be located on a lower surface of the heater plate to provide a tight and precise connection of the heater plate to the base plate. In order to be able to receive the bolt element of the heating plate in a force-fit and form-fit manner, the base plate can comprise a clamping element. The bolt element may preferably be disposed at a center of the heater plate, and the clamping element may preferably be disposed at a center of a top surface of the base plate facing the heater plate.

In one embodiment, the heating plate comprises heating elements and an insulating layer. The insulating layer is arranged below the heating elements for insulation in the direction of the base plate. For example, the heating plate may comprise ceramic heating elements. By means of the heating plate, the building panel can be heated to several hundred ° C. In particular, the building panel can be heated to 250° C. or even to 500-600° C. Below the heating elements, but inside the heating panel, an insulating layer may be provided so that the heating heat can be conducted only to the building panel without exception. In other words, conduction of the heating heat toward the base plate can be prevented by the insulating layer. In this way, an efficiency and a quality of additive manufacturing can be increased.

In one embodiment, the base plate comprises at least one cooling line coupled to an inlet and an outlet of a cooling medium through the lifting rod. The cooling line may be located inside the base plate or on an underside of the base plate, within which a cooling medium is routed. An inlet connection and an outlet connection of the cooling medium may be integrated on the lifting rod, which are coupled to the cooling line. In this way, a proper circulation of the cooling medium, consequently an efficient cooling of the base plate can be enabled. Consequently, heat generated below the heating plate can be blocked and associated thermal expansion of the building container, particularly in the vertical direction, can be prevented.

In one embodiment, the building container comprises at least one fixing element with a spring-loaded bolt and a clamping ball. During a container exchange, the clamping ball can be clamped to the building panel by the spring-biased bolt. The fixing element can preferably be arranged at the bottom of the building container to hold the base plate, the heating plate and/or the building panel there during the container exchange and/or a reprocessing of the building container. The building container may preferably have two or more fixation elements to provide a reliable connection between the container bottom and the base plate, the heating plate and/or the building panel.

The fixation element may comprise at least one, preferably a pair, of clamping balls and a bolt connected to a spring in the direction of the interior of the container. The fixation element may further comprise a housing that receives the spring-biased bolt and the tensioning ball. The housing of the fixation element may be integral with the container housing. The spring-biased bolt may move vertically within the housing, wherein the movement of the bolt may be constrained by the spring and the tensioning ball disposed on a lateral inner side of the housing. In other words, the tensioning ball can clamp the spring-biased bolt to the building panel so that the spring-biased bolt can hold the building panel in a retracted position. When the pin is in a retracted position, the building panel can be released.

When the building container is removed from the additive manufacturing system, the base plate, hot plate, and/or building panel may move as the container is transported, reworked, and/or refreshed, which may cause the building panel to become detached from the base plate. To prevent the displacement and/or detachment of one or the other plate, the bolt with the spring can be pushed into the fixing position through the through hole of the heating plate into the building panel. At the same time, the bolt can push the clamping ball outward. Consequently, a positive and non-positive connection can be made between the building panel and the container housing, in particular the container base of the building container. Since the heating plate is located between the building panel and the base plate, the heating plate can be automatically clamped as well.

During additive manufacturing, the fixing element can be in a reset position so that the bolt is not engaged with the building panel. In this way, the building panel, heating panel, and/or base plate could be raised and/or lowered within the building container by the lifting rod.

In one embodiment, the additive manufacturing system further comprises a building chamber and a lifting device. The building chamber is couplable to the container unit for applying the powder to the building panel, and the lifting device is configured for lifting the transportable container unit to a bottom of the building chamber.

The building chamber may be configured to perform selective melting of the powder. The lifting means may be configured to dock the container unit, which is externally inserted into the manufacturing system, to the bottom of the building chamber. In particular, the building panel of the building container may be coupled to the bottom of the building chamber by lifting the container unit by means of the lifting device and, additionally, by lifting the building panel by means of the lifting rod.

The building chamber may include a doctor blade that applies the fresh powder from the powder storage container to the building panel of the building container in layers, and transports the excess residual powder from the building panel to the powder overflow container. Further, the building chamber may include an opening sealed, for example, by an optically transparent material. Through this opening, the laser beam can be provided to expose a fresh layer of powder applied to the building panel.

In one embodiment, the bottom of the building chamber includes a sealing interface configured to positively connect the container assembly to the building chamber in a gas-tight manner. The sealing interface may be disposed between the bottom of the building chamber and the container unit, which is lifted to the bottom of the building chamber by the lifting device. The sealing interface may include a circumferential seal surrounding an upper edge of the container unit to provide a vacuum tight connection between the container unit and the building chamber. Openings of the powder storage container, the building container, and/or the powder overflow container may be located at the upper edge of the container unit.

In one embodiment, the seal interface has a gap for collecting a powder residue. The gap is coupled to a cleaning nozzle for blowing out the powder residue. The gap may be located between the container unit and the sealing interface, and may extend at least partially along the circumferential direction of the upper edge of the container unit. In particular, the gap may be provided between the seal interface and the opening of the powder overflow container.

The gap may further extend at least partially from the bottom of the building chamber toward the bottom of the container, such that one end of the gap is exposed in the building chamber. Further, another end of the gap may be connected to the cleaning nozzle through which, for example, air or inert gas is discharged. In other words, between the seal interface and the container assembly may be the cleaning nozzle, which is coupled to the gap. During additive manufacturing, the excess powder may be collected in the gap and it may be expelled from the gap by the gas after completion of additive manufacturing to avoid powder carryover during a container removal.

In one embodiment, a temperature control means may be integrated into the seal interface. The temperature control means may be configured to prevent unwanted material expansion in the area of the seal interface, both at the building container and at the bottom of the building chamber.

In one embodiment, the additive manufacturing system further comprises an inert gas inlet and an inert gas outlet. The shielding gas inlet and the shielding gas outlet are arranged to generate a shielding gas flow relative to the building panel. The shielding gas inlet and/or the shielding gas outlet may be configured such that the shielding gas flow exits only a few millimeters above the building panel, i.e., process level. The shielding gas inlet and/or the shielding gas outlet can preferably be arranged perpendicular to the direction of movement of the doctor blade. Alternatively, the shielding gas inlet and/or the shielding gas outlet can be arranged parallel to the direction of movement of the doctor blade.

The shielding gas inlet can be configured to feed the shielding gas into the building chamber, and the shielding gas outlet can be used to draw in the shielding gas released in the building chamber. By continuously feeding and discharging the shielding gas, a laminar and homogeneous shielding gas flow can be generated in the building chamber. Thereby, the doctor blade, which is arranged parallel to the flow direction of the shielding gas flow, can avoid a partial detour and/or turbulence of the shielding gas flow.

In one embodiment, the shielding gas inlet may comprise a porous element for providing a homogeneous shielding gas flow. The porous element may be configured to create a dynamic pressure in the shielding gas inlet. The porous element may be understood as a filter element disposed at the shielding gas inlet and extending across the entire width and height of the shielding gas inlet. The porous element may have a uniform porosity over the entire surface of the porous element. The porous element may be a sintered element or a foam-like but gas-permeable element. Thus, a constant dynamic pressure can be generated in the shielding gas inlet and the shielding gas flow can have no velocity gradients in the area of the shielding gas inlet. In this way, a homogeneous supply of the shielding gas into the construction chamber can be realized.

Furthermore, the shielding gas outlet can be designed to completely absorb the shielding gas admitted into the construction chamber and not cause any tapering of the laminar and homogeneous shielding gas flow.

In one embodiment, the additive manufacturing system may include a shielding gas inlet opening located above the building panel. Through the shielding gas inlet opening, the shielding gas can additionally be supplied to the building panel above the building panel. The shielding gas inlet opening can be arranged on a same side of the shielding gas inlet, i.e. on an opposite side of the shielding gas outlet. Thus, the shielding gas discharged from the shielding gas inlet opening can also be discharged through the shielding gas outlet.

A graded porous structure may be disposed between the shielding gas inlet opening and the building chamber. The graded porous structure may also be disposed opposite the shielding gas outlet. The term "graded porous structure" may be understood to mean that there is a gradation of porosity in the porous structure. By using the porous structure, a slight static overpressure can be generated between the shielding gas inlet port and the porous structure which allows the shielding gas to flow homogeneously through the porous structure.

Further, the graded porous structure can serve to regulate a velocity of the shielding gas flow. For example, a fast gas flow can be generated directly at a laser exit window, which helps to prevent the deposition of smut or weld spatter at the laser exit window.

This shielding gas flow coming from above can support the laminar nature of the shielding gas flow near the building chamber, flowing from the shielding gas inlet to the shielding gas outlet. In this way, larger eddies within the building chamber, in which flue gas could collect, which at the same time could adversely affect the laser beam due to its high absorptivity, can be largely avoided by the shielding gas flow coming from above.

In one embodiment, the additive manufacturing system further comprises an optical bench. The optical bench comprises an off-axis monitoring device and an on-axis monitoring device. The off-axis monitoring device is configured to monitor a heat distribution of an additively manufactured component layer of the workpiece and an application quality of a last applied powder layer. The on-axis monitoring device is configured to determine a temperature of a powder bath on the currently manufactured component layer.

The off-axis monitoring device may include one, at least one, or two high resolution, high spectral bandwidth multifunction cameras in the building chamber capable of detecting thermal process emissions during additive manufacturing using optical bandpass filters. A data capture of the camera images may be designed to integrate emission data occurring and captured during exposure of a powder layer within an image. The result of this reception may correspond to a heat map of the currently built layer. From this heat map, it may be possible to detect thermal irregularities during additive manufacturing and, if this information is processed sufficiently quickly, to take countermeasures during a subsequent layer. This can be, for example, a dynamic adjustment of exposure sequences of areas to be scanned within a layer, laser powers or a scanning speed within certain scan areas.

The off-axis cameras can also be used to detect powder application errors that may occur during a coating process. During powder application, line-like structures can occur in the direction of the squeegee travel. Visibility of such powder application defects may increase most when illuminated by side lighting to create a shadow. The powder application defect and/or the coating defect can then be detected indirectly via a characteristic shadow using the off-axis camera.

In addition, the off-axis monitoring equipment can be configured for scanner calibration. The scanner calibration can be performed prior to a start of additive manufacturing with a clean and powder-free building panel.

The on-axis monitoring device may include a ratio pyrometer, photodiodes, and/or a high-speed camera designed to detect the temperature of the powder bath. The building panel within the building container may contain the powder bath surrounding workpieces produced by the selective melting process.

The ratio pyrometer may be designed to detect the maximum temperatures in the powder bath. The high-speed camera can be used to detect a powder bath shape and a distribution of a heat radiation intensity in the powder bath, which can contribute to an improved overall understanding of the process. The photodiodes can also be used to detect the heat radiation in the molten bath or powder bath.

In this way, precise detection of thermal process emissions in the building chamber can be realized, fulfilling a requirement for real-time control of additive manufacturing.

In one embodiment, the powder storage container and the building container each comprise a lid. The lid includes a protrusion for gripping the lid. To enable contamination-free transport of the container unit, in particular the powder storage container and the building container, each container can have a lid. The lid can be configured to hermetically seal the respective container from the outside. In addition, the powder overflow container may also have a lid. A projection can be formed on each lid, which can be grasped manually or by means of a robot arm, in order to remove the lid from the respective container and/or to close the respective container with the lid.

In one embodiment, the first side of the manufacturing system faces the second side of the manufacturing system. Thus, the operator area can be arranged relative to the building chamber opposite the loading area. In other words, the operator area can be configured at the front of the manufacturing system, while the loading area can be configured at the rear of the manufacturing system, and vice versa. In this way, the operator area and the loading area cannot cross each other and contamination-free access into the additive manufacturing system can be ensured.

In one embodiment, the operator area comprises a monitor for monitoring and/or controlling data and/or functions of the manufacturing system. Preferably, a user interface may be arranged on an exterior of the operator area to enable control as well as operation of the additive manufacturing system. The monitor can be designed as a touch screen The monitor may show a sequence of the additive manufacturing process, an operating parameter, a state of the additive manufacturing system, and/or any required machine functions and data, for example, to allow the operator to monitor the additive manufacturing process and control and/or maintain the additive manufacturing system according to the displayed information. If necessary, various process variables can also be parameterized via the monitor. The monitor may therefore be electronically connected to a control device and/or various sensing devices to enable monitoring and/or control of the manufacturing system.

In one embodiment, the operator area comprises an openable access to the building chamber. The openable access may be a door or window, allowing the operator to enter the building chamber, for example, to perform maintenance. The access may have a door that slides sideways or may be an opening sealed with a transparent material. At the openable access, the monitor may be integrated.

In one embodiment, the loading area includes an interface for automated or manual insertion of the transportable container unit. Like the operator area, the loading area may include a door or opening whereby the transportable container unit may be inserted into and removed from the manufacturing system, either manually or automatically. In particular, the transport of the container unit may be performed by means of a robotic arm or the like to avoid possible contamination by humans.

The present invention further comprises an additive manufacturing process. The additive manufacturing method comprises the following steps:

providing an additive manufacturing system having an operator area, a loading area, and a transportable container unit, wherein the operator area is configured to control the manufacturing system, wherein the loading area is configured to load the manufacturing system, wherein the operator area is accessible from a first side of the manufacturing system, wherein the loading area is accessible from a second side of the manufacturing system, and wherein the first side is different from the second side; and inserting the transportable container unit into the loading area, wherein the transportable container unit comprises a powder storage container and a building container, and wherein the powder storage container is configured to store powder, and the building container is configured to additively manufacture a workpiece.

By separating the operator area and the loading area, contamination-free additive manufacturing and full automation of additive manufacturing can be realized without having to provide personal protective equipment. Thus, operator safety and equipment safety can also be ensured.

In one embodiment, the additive manufacturing process further comprises lifting the transportable container unit by means of a lifting device at a bottom of a building chamber after inserting the transportable container unit into the loading area. With the insertion of the container unit into the manufacturing system, the additive manufacturing process can be fully automated. The lifting device can move either individual containers or the entire container unit in the vertical direction. Thus, the container unit can be docked at the bottom of the building chamber by means of the lifting device to position freshly prepared powder, a building panel, and/or a powder overflow container into the building chamber.

In one embodiment, the additive manufacturing process further comprises first admitting an inert gas into the building chamber to inertize the building chamber after lifting the transportable container unit. The inerting can be understood as removing unwanted gas such as oxygen from the building chamber by an evacuation device and then providing an inert gas such as argon, nitrogen, etc. to allow for the lowest possible oxygen content. In this way, production of a high quality product can be ensured.

When the powder storage container, the building container, and the powder overflow container are aligned with a process position for additive manufacturing, an inert gas can be injected into the building chamber. However, the initial inerting of the building chamber can be done without removing the lid of the respective container of the container unit. The inert gas, i.e., inert gas may comprise a very small amount or no amount of oxygen.

In one embodiment, the additive manufacturing process further comprises removing a lid from each of the powder storage container and the building container after the first introduction of an inert gas. The lid of the respective container may also be removed automatically. To enable this, for example, a gripper arm or robotic arm may engage a projection formed on an outer surface of the lid. The gripper arm can move the lid to a lid storage position. The powder storage container lid, the building container lid, and/or the powder overflow container lid can be removed simultaneously or sequentially and returned to their respective containers after additive manufacturing.

In one embodiment, the additive manufacturing process further comprises vacuuming the building chamber and then introducing a second inert gas into the building chamber to inert the opened containers after the lid is removed. After the opening of the respective lid of the container unit, an interior of the respective container in the building chamber may be exposed. The second inerting of the construction chamber can, in particular, also inert the fresh powder contained in the powder storage container to protect the fresh powder from oxidation.

Further features, advantages and possible applications of the present invention will be apparent from the following description, the embodiment examples and the figures. All the features described and/or illustrated may be combined with one another, irrespective of their representation in individual claims, figures, sentences or paragraphs. In the figures, identical reference signs stand for identical or similar objects.

BRIEF DESCRIPTION OF THE FIGURES

FIGS. 4a, 4b show a top view of an additive manufacturing system according to an embodiment of the present invention.

FIGS. 5a, 5b show an additive manufacturing system according to an embodiment of the present invention.

FIG. 6 shows a container unit and a building chamber of an additive manufacturing system according to an embodiment of the present invention.

FIG. 7 shows a container unit of an additive manufacturing system according to an embodiment of the present invention.

FIGS. 8a, 8b show a building container of an additive manufacturing system according to an embodiment of the present invention.

FIG. 13 schematically shows an inert gas flow in a building chamber according to an embodiment of the present invention.

DETAILED DESCRIPTION OF THE EMBODIMENTS

Figure 1:
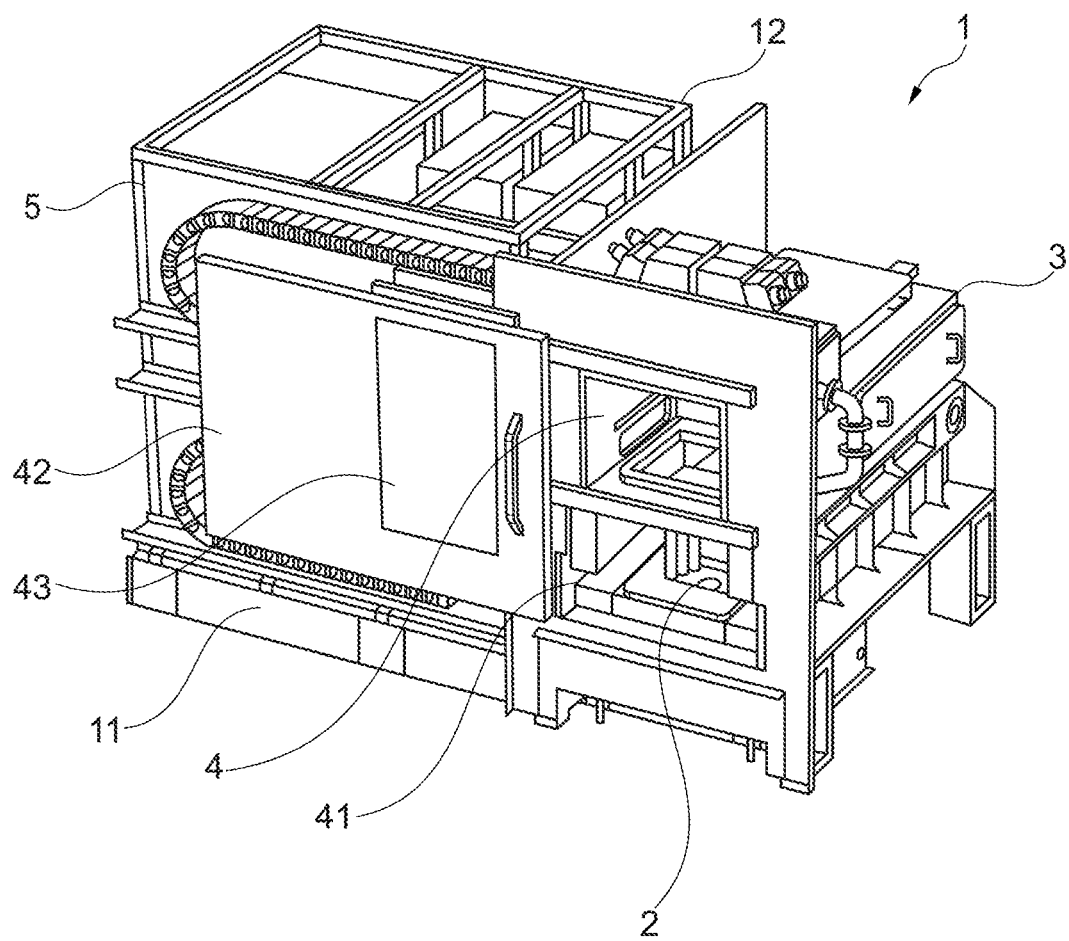
FIG. 1 shows an additive manufacturing system according to an embodiment of the present invention.

FIG. 1 shows an additive manufacturing system 1 according to the invention. The additive manufacturing system 1 may be designed to produce a workpiece by selective laser melting (SLM) of a layered powder material.

The additive manufacturing system 1 includes an operator area 2, a loading area 3, and a building chamber 4. The operator area 2 is accessible from a first side 11, i.e., a front side 11 of the additive manufacturing system 1 and is configured to control the manufacturing system 1. The loading area 3 is arranged opposite the operator area 2, i.e. at the rear side 12 of the additive manufacturing system 1 and is configured for loading the manufacturing system 1. The selective melting of the layered powder takes place in the building chamber 4. The additive manufacturing system 1 further comprises a peripheral area 5 housing peripheral technologies such as an inert gas cooling system, a gas circulation pump, a vacuum pump, a soot particle filter, a cooling system, and/or a laser. The peripheral technologies are slidably mounted in the peripheral area 5.

Figure 2A:
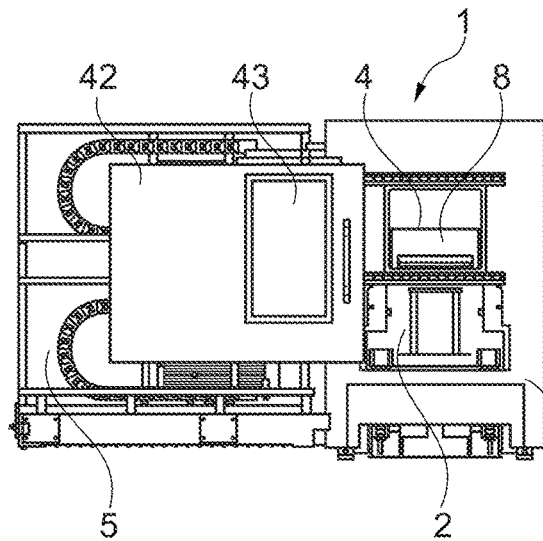
FIGS. 2a, 2b show an operator area of an additive manufacturing system according to an embodiment of the present invention.
Figure 2B:
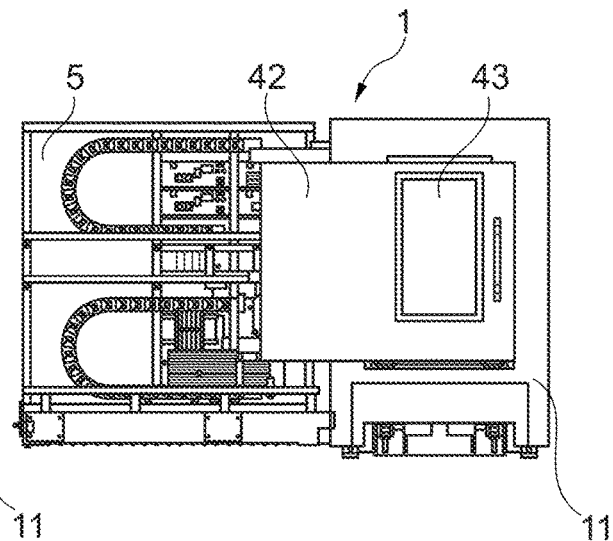

As shown in FIGS. 2a and 2b, the operator area 2 has an openable access 41 to the building chamber 4. The access 41 has a laterally slidable door 42. Integrated on the sliding door 42 is a monitor 43 configured to monitor and/or control data and/or functions of the manufacturing system 1. The monitor 43 may display a sequence of the additive manufacturing process, an operating parameter, a state of the additive manufacturing system 1, and/or any required machine functions and data, for example, to allow the operator to monitor the additive manufacturing process and control and/or maintain the additive manufacturing system 1 according to the displayed information. If necessary, various process variables can also be parameterized via the monitor 43.

Figure 3:
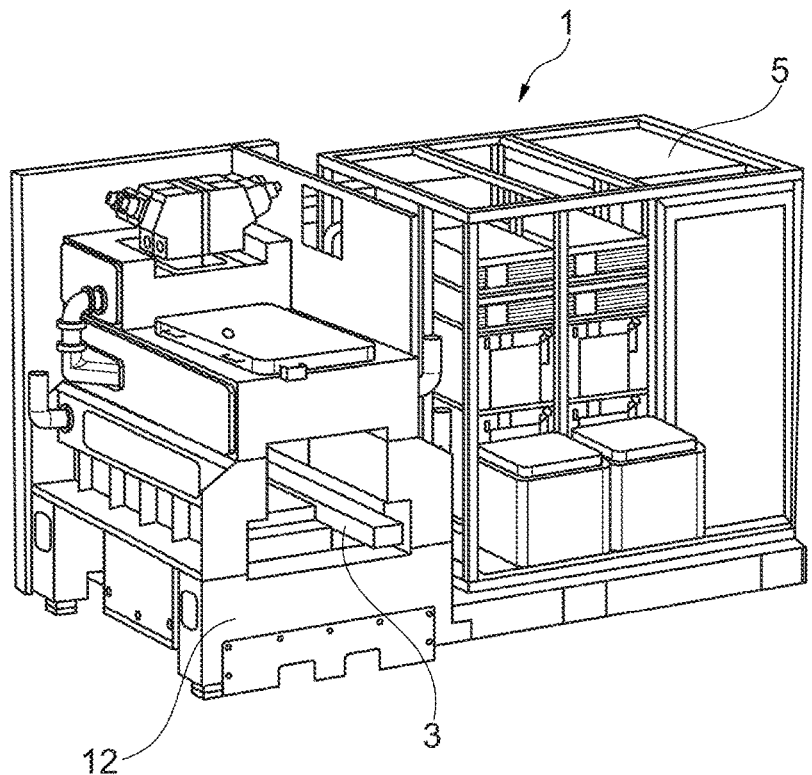
FIG. 3 shows a loading area of an additive manufacturing system according to an embodiment of the present invention.

FIG. 3 shows the rear side 12 of the additive manufacturing system 1, at which the loading area 3 is configured. The loading area 3 comprises an interface for automated or manual insertion of a transportable container unit 6. As shown in FIGS. 4a and 4b, the container unit 6 can be inserted into the loading area 3 at the rear side 12 of the manufacturing system 1. After a completion of the additive manufacturing of the workpiece, the container unit 6 can be automatically or manually removed from the manufacturing system 1 via the loading area 3.

Thus, the operator area 2 and the loading area 3 are spatially separated from each other so that an access of the operator area 2 and an access of the loading area 3 do not cross each other.

When the transportable container unit 6 is inserted into the building chamber 4, the container unit 6 will be positioned on a lifting device 7. The lifting device 7 is designed to lift the container unit 6 in order to dock it to the building chamber 4, in particular to the floor 44 of the building chamber 4 (see FIGS. 5a and 5b).

FIG. 6 shows the container unit 6 coupled to the building chamber 4. The container unit 6 comprises a powder storage container 61, a building container 62 and a powder overflow container 63. The powder overflow container 63 is integrally formed on the building container 62. The powder storage container 61 is configured for storing a freshly prepared powder material, which is layered onto a building panel 72 of the building container 62 during additive manufacturing. The building container 62 is configured to perform additive manufacturing of the workpiece by selectively melting the powder layered on the building panel 72 by a laser beam (see FIG. 7). After the selective melting of the deposited powder, the excess powder can be collected into the powder overflow container 63.

The additive manufacturing system 1 further comprises a doctor blade 8 configured for applying the powder from the powder storage container 61 to the building panel 72 of the building container 62 in layers, and removing the excess powder from the building container 62 toward the powder overflow container 63. Therefore, the powder storage container 61, the building container 62 and the powder overflow container 63 may be arranged in this order in the container unit 6.

A sealing interface 45 is arranged at the bottom 44 of the building chamber 4, which is configured for positive and gas-tight connection of the container unit 6 to the building chamber 4. The bottom 44 of the construction chamber 4 comprises an opening 48 with which the container unit 6 can be coupled (see also FIG. 11). The sealing interface 45 surrounds the opening 48 and the top edge 64 of the respective container of the container unit 6 to provide a vacuum tight connection between the container unit 6 and the building chamber 4.

The sealing interface 45 includes a gap 46 for collecting a powder residue. The gap 46 is disposed between the upper edge 64 of the container unit 6 and the sealing interface 45, and extends at least partially along the circumferential direction of the upper edge 64 of the container unit 6. The gap 46 extends at least partially from the bottom 44 of the building chamber 4 toward the bottom 65 of the container, such that one end of the gap is exposed in the building chamber 4. The opposite end of the gap 46 is coupled to a cleaning nozzle 47 for blowing out the powder residue, wherein the cleaning nozzle 47 is integrated between the seal interface 45 and the container assembly 6.

During additive manufacturing, the excess powder can be collected in the gap 46, and it can be expelled from the gap 46 by the gas after the completion of additive manufacturing to avoid powder carryover during a container removal.

FIG. 7 shows the building container 62 to which the powder overflow container 63 is integrated. The building container 62 includes a base plate 74 and a lifting rod 75. The lifting rod 75 is configured to move the base plate 74 in a vertical direction within the building container 62. The base plate 74 of the building container 62 can seal an interior of the building container 62 to the outside. Preferably, the base plate 74 of the building container 62 can be gradually lowered downwardly by the lifting rod 75 after each melting operation or exposure of the laser beam to allow the following melting operation of the reapplied powder.

The building container 62 further comprises a heating plate 73 and a building panel 72. The building panel 72 can receive the powder applied by the squeegee 8 in layers and allow the powder to be selectively melted. In other words, the powder is selectively melted on the building panel 72 of the building container 62 by laser.

The heating plate 73 is disposed between the building panel 72 and the base panel 74. The heating plate 73 includes heating elements 81 and an insulating layer 82, and the heating plate 73 is configured to heat the building panel 72. By means of the heating elements 81, the building panel 72 can be heated to several hundred ° C. By heating the building panel 72, a stress on the generated workpiece can be reduced by reducing a temperature gradient between the generated material layers of the workpiece. However, the heating heat should not be conducted toward the base plate 74 to avoid a mechanical stress caused by the heat. Therefore, the insulating layer 82 is disposed below the heating elements 81 for insulation in the direction of the base plate 74.

The building container 62 further comprises a lid 71 configured to seal the building container 62 to allow contamination-free transportation of the building container 62 and to maintain an inert state of the building container 62. The lid 71 includes a protrusion 79 for gripping the lid 71. After the container assembly 6 is docked to the bottom 44 of the building container 4, the lid 71 of the building container 62 may be removed manually or automatically. Preferably, the protrusion 79 of the lid 71 can be held by a robotic arm or gripper arm to transport the lid 71 to a lid storage location 49 (see FIG. 6). The robotic arm can return the lid 71 to the container unit 6 after the additive manufacturing of the workpiece to close the building container 62.

FIGS. 8*a* and 8*b* show how the base panel 74, the heating panel 73 and the building panel 72 of the building container 62 are connected to each other. The building panel 72 and the heating panel 73 are connected to each other by means of a three-point support system. On an underside of the building panel 72 facing the heating panel 73, three bolt elements 31 are arranged to rest on the heating panel 73. The bolt elements 31 can project from the underside of the building panel 72 in the direction of the heating plate 73 and can each be spaced as far apart as possible from one another. In this way, a loose but secure three-point support of the building panel 72 can be realized. In addition, the underside of the building panel 72 has at least two dowel pins 35 which fix the building panel 72 during post-treatment of the building panel 72.

Furthermore, a through hole 32 is provided in each corner of the heating plate 73. Through the through holes 32, fastening bolts 51 extending from the edge of the building container 62 through the heating plate 73 and into the building panel 72 without contact can be inserted. These fastening bolts 51 may serve to clamp or lock the building panel 72 at a lowest position within the building container 62 (see FIGS. 9*a* and 9*b*).

In addition, a bolt element 33 for a zero-point clamping system is located on a lower surface of the heater plate 73 to provide a tight and precise connection to the base plate 74. In order to be able to receive the bolt element 33 of the heating plate 73 in a force-fit and form-fit manner, the base plate 74 comprises a clamping element 34.

The base plate 74 comprises at least one cooling line 78 which is coupled by the lifting rod 75 to an inlet 76 and an outlet 77 of a cooling medium (see FIG. 7). Inside the base plate 74 or at an underside of the base plate 74, the cooling line 78 may be located within which a cooling medium is guided. Consequently, heat generated below the heating plate 73 can be blocked and associated thermal expansion of the building container 62, particularly in the vertical direction, can be prevented.

Figure 9B:
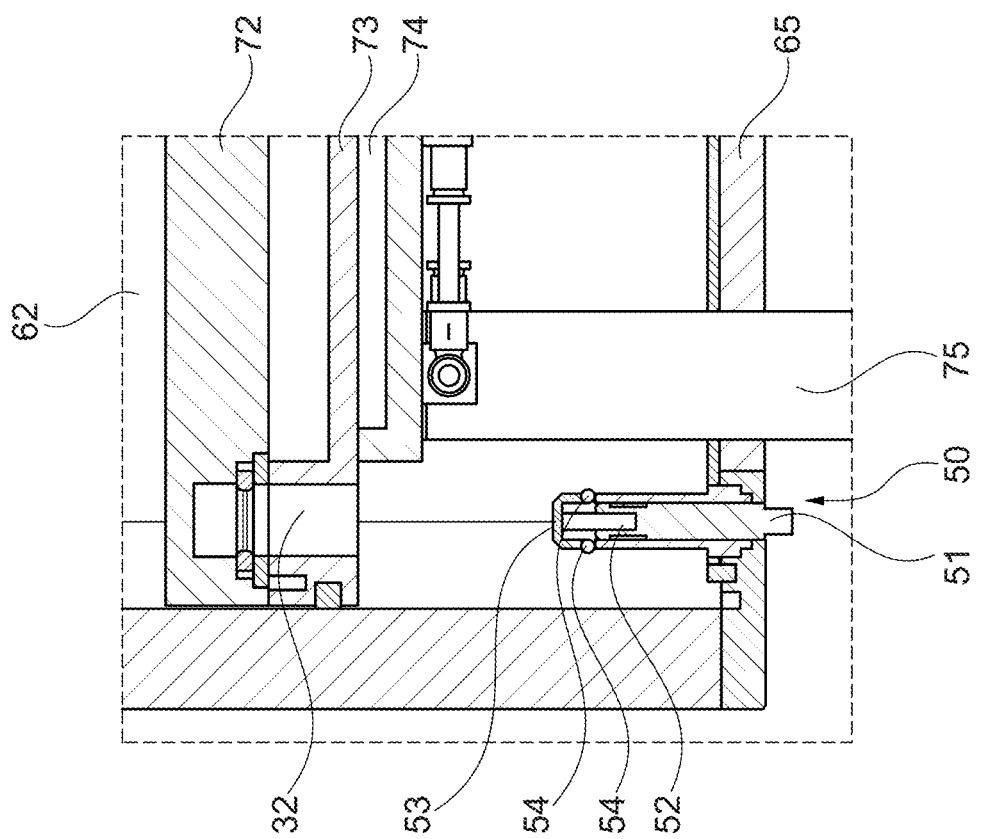
FIG. 9a, 9b show a fixing element of an additive manufacturing system according to an embodiment of the present invention.
Figure 9A:
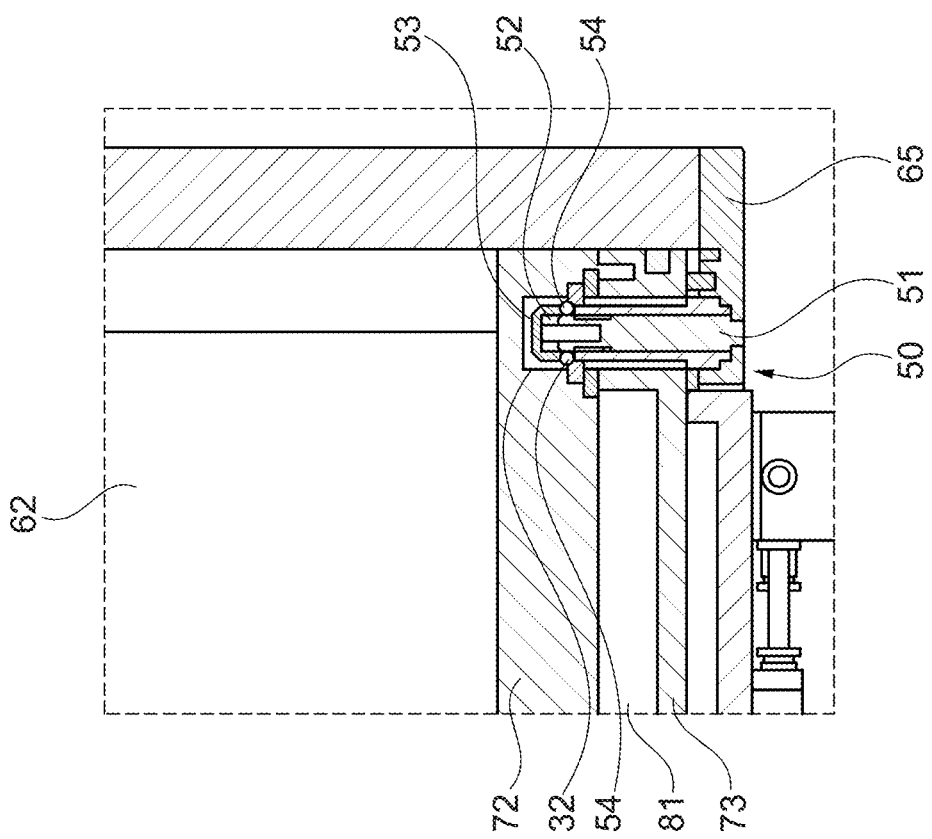

FIGS. 9*a* and 9*b* show a bottom side 65 of the building container 62. The building container 62 comprises at least one fixing element 50, preferably two or more fixing elements 50. The fixing element 50 comprises at least one, preferably a pair of clamping balls 54 and a bolt 51 connected to a spring 52 in the direction of the interior of the container 62. The fixation element 50 further comprises a housing 53 that receives the spring-biased bolt 51 and tensioning ball 54. The housing 53 of the fixation element 50 is integrated to the container housing. The spring-biased bolt 51 can move vertically within the housing 53, wherein the movement of the bolt 51 can be restricted by the spring 52 and the tensioning ball 54 disposed on a lateral side of the housing 53.

During a container replacement, the clamping ball 54 may be clamped to the building panel 72 by the spring biased pin 51. When the building container 62 is removed from the additive manufacturing system 1, the base plate 74, heating plate 73, and/or building panel 72 may move as the container 62 is transported, reworked, and/or refreshed, which may cause the building panel 72 to become detached from the base plate 74. To prevent displacement and/or detachment of one or the other of the plates, the pin 51 can be pressed into a fixing position in the building panel 72 via the through holes 32 of the heating plate 73 by the spring 52, wherein the pin 51 pushes the clamping ball 54 outwardly (see FIG. 9*a*). Consequently, a positive and non-positive connection can be made between the building panel 72 and the container housing, in particular the container base 65 of the building container 62. Since the heating plate 73 is located between the building panel 72 and the bottom 65 of the building container 62, the heating plate 73 can be automatically clamped in place as well.

During additive manufacturing, the fixing element 50 may be in a reset position so that the bolt 51 is not engaged with the building panel 72. In this way, the building panel 72, heating plate 73 and/or base plate 74 could be raised and/or lowered within the building container 62 (see FIG. 9*b*).

Figure 10:
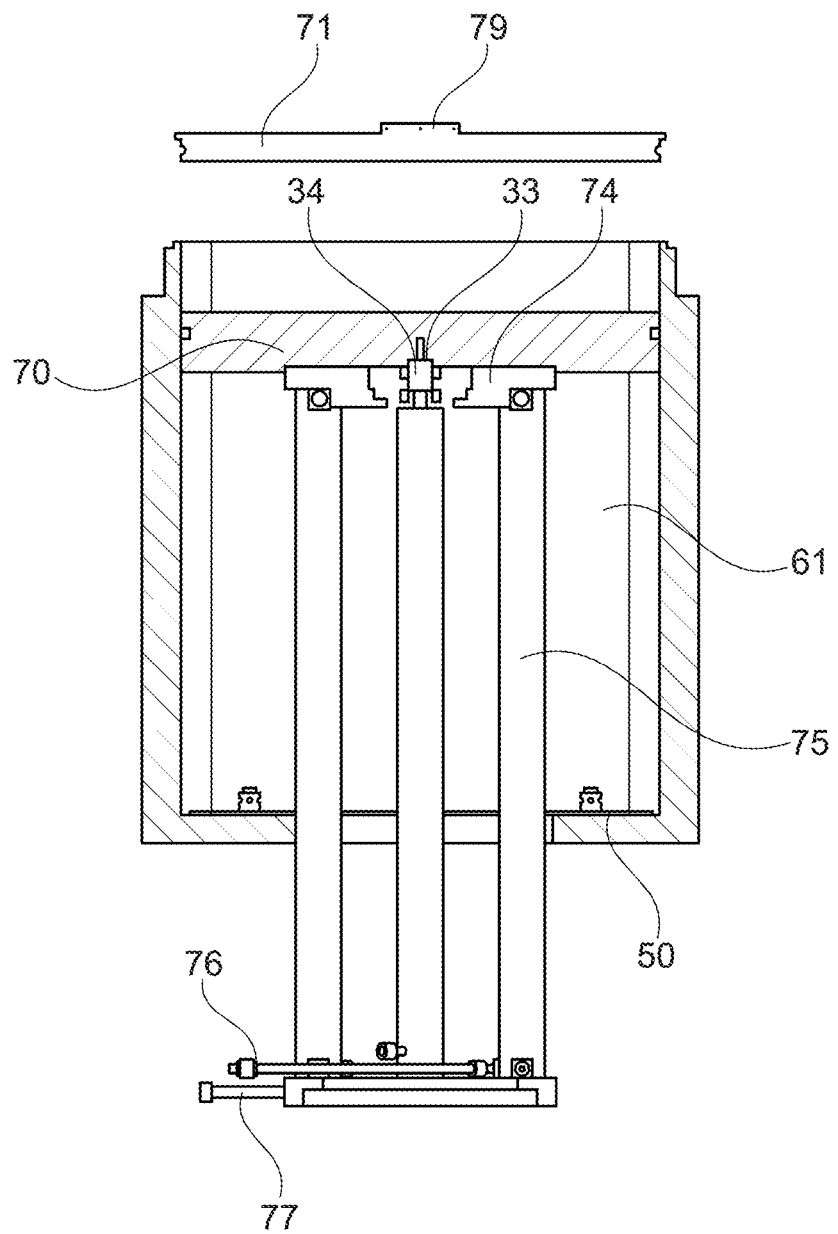
FIG. 10 shows a powder storage container of an additive manufacturing system according to an embodiment of the present invention.

FIG. 10 shows the powder storage container 61 configured to store the freshly prepared powder. The powder storage container 61 includes a base plate 74 and a lifting rod 75 that raises or lowers the base plate 74 within the powder storage container 61. The powder storage container 61 further comprises a base plate 70 that is connected to the base plate 74 by means of a zero-point clamping system, i.e., with a bolt element 33. Thus, the base plate 70 can be adjusted vertically with the base plate 74. Preferably, the lifting rod 75 of the powder storage container 61 can lift the base plate 74 upwards, so that the freshly prepared powder can be provided without gaps on the surface of the powder storage container 61.

At least one fixing element 50, preferably two or more fixing elements 50, can also be provided at the bottom of the powder storage container 61 in order to fix the base plate 70 to the bottom of the powder storage container 61, for example, during transport. The powder storage container 61 further comprises a lid 71 configured to seal the powder storage container 61 to allow contamination-free transportation of the powder storage container 61 and to maintain an inert state of the powder storage container 61.

The powder storage container 61 may be the same size as or smaller than the building container 62. The powder storage container 61 may be connected to the building container 62 by both containers being integrally formed. Alternatively, they may be independently manufactured.

Figure 11:
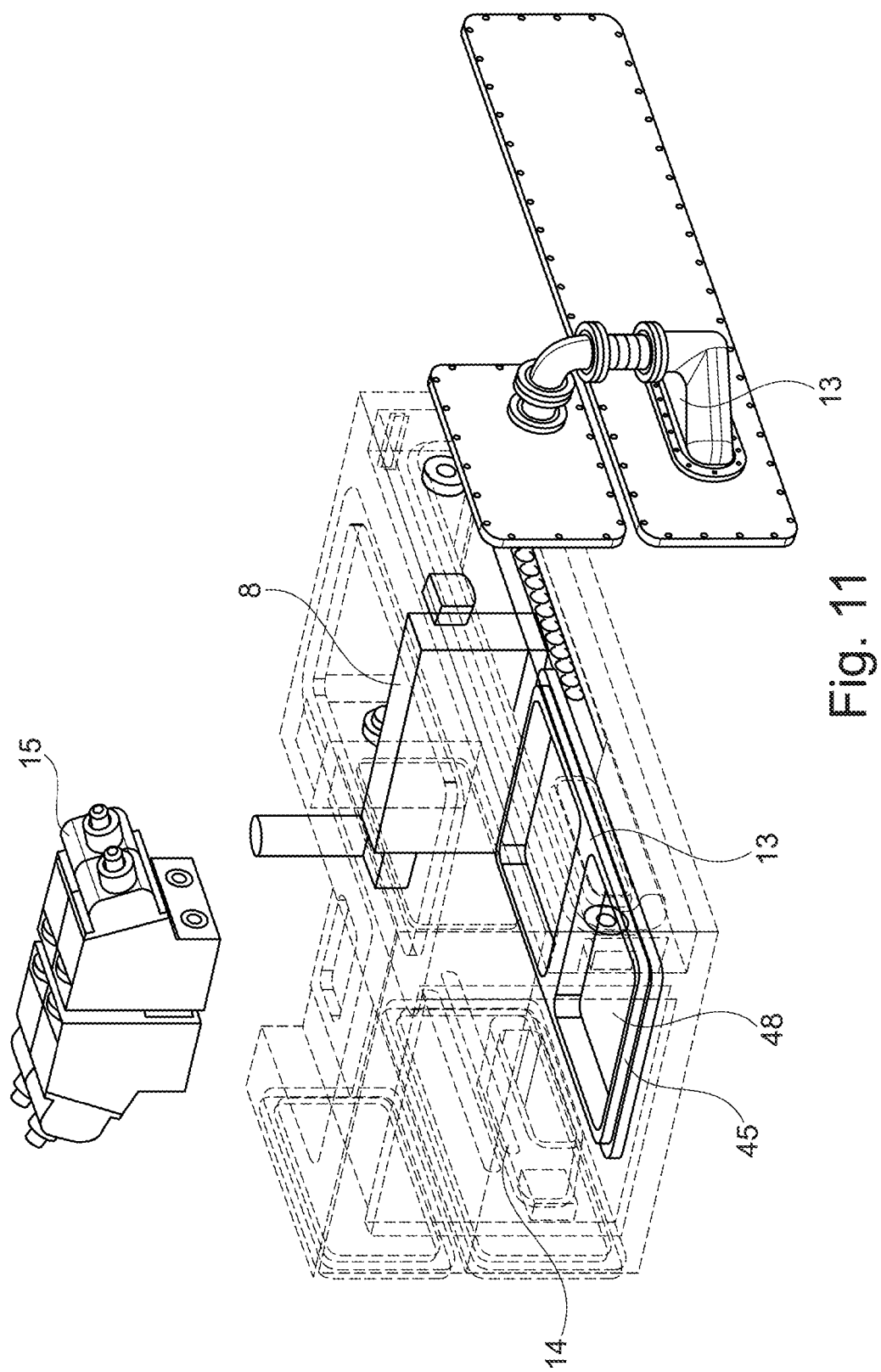
FIG. 11 shows an additive manufacturing system according to an embodiment of the present invention.

The additive manufacturing system 1 further comprises a shielding gas inlet 13, a shielding gas outlet 14, and an optical bench 15, as shown in FIG. 11. In FIG. 12*a*, the shielding gas inlet 13 and shielding gas outlet 14 are shown enlarged. The shielding gas inlet 13 and shielding gas outlet 14 are arranged to generate a shielding gas flow 16 relative to the building panel 72. The shielding gas inlet 13 and the shielding gas outlet 14 are arranged perpendicular to the direction of movement of the squeegee 8.

The shielding gas inlet 13 is configured to feed the shielding gas into the building chamber 4. Through the shielding gas outlet 14, the shielding gas released in the building chamber 4 will be sucked in. Furthermore, the shielding gas outlet 14 can be designed to completely absorb the shielding gas let into the construction chamber 4 and not cause a tapering of the laminar and homogeneous shielding gas flow 16.

A laminar and homogeneous protective gas flow 16 can be generated in the construction chamber 4 by continuously feeding and discharging the protective gas. Thereby, the squeegee 8 can be arranged parallel to the flow direction of the protective gas flow 16, whereby a partial detour and/or turbulence of the protective gas flow 16 can be avoided. The shielding gas is designed to prevent the deposition of flue gas or weld spatter in the building chamber 4. The shielding gas may be an inert gas such as argon or nitrogen.

Figure 12B:
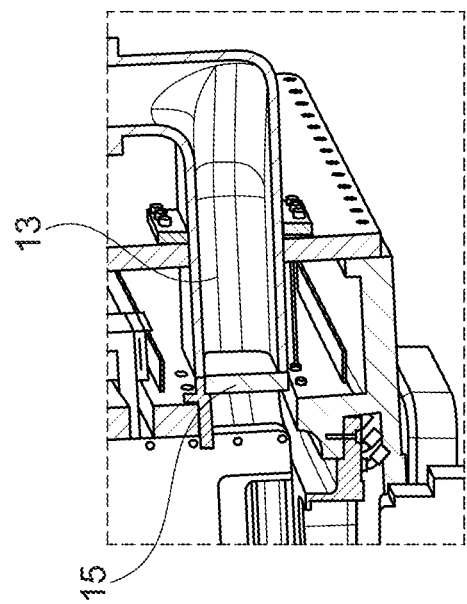
FIG. 12a, 12b show a construction chamber of an additive manufacturing system according to an embodiment of the present invention.
Figure 12A:
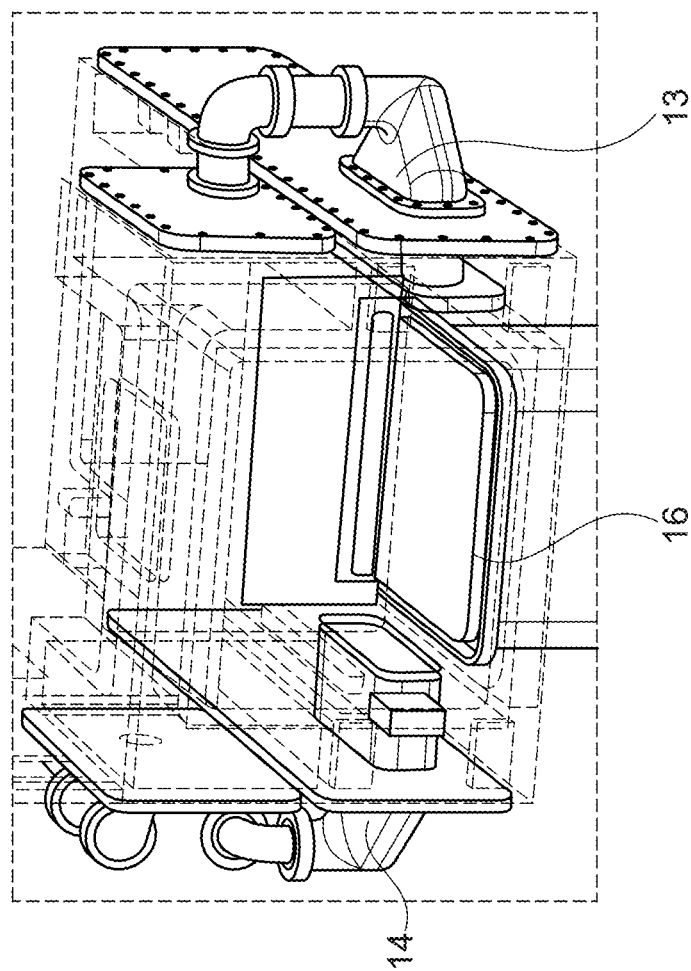

As shown in FIG. 12b, the shielding gas inlet 13 has a porous element 15 for providing a homogeneous shielding gas flow 16. The porous element 15 may be configured to create a dynamic pressure in the shielding gas inlet 13. The porous element 15 may be understood as a filter element disposed at the shielding gas inlet 13 and extending across the entire width and height of the shielding gas inlet 13. The porous element 15 may have a uniform porosity over the entire surface of the porous element. Thus, the shielding gas flow 16 may have no velocity gradients in the area of the shielding gas inlet 13.

FIG. 13 schematically shows a shielding gas flow 16 in the building panel 4. The additive manufacturing system 1 may additionally have a shielding gas inlet opening 17, which is located above the building panel 72. Through the shielding gas inlet opening 17, the shielding gas can additionally be fed into the building panel 4 above the building panel 72.

A graded porous structure 18 may be disposed between the shielding gas inlet opening 17 and the building chamber 4. By using the porous structure 18, a slight static overpressure can be created between the shielding gas inlet opening 17 and the porous structure 18, allowing the shielding gas to flow homogeneously through the porous structure 18. Further, the graded porous structure 18 may serve to regulate a velocity of the shielding gas flow 16.

Figure 14:
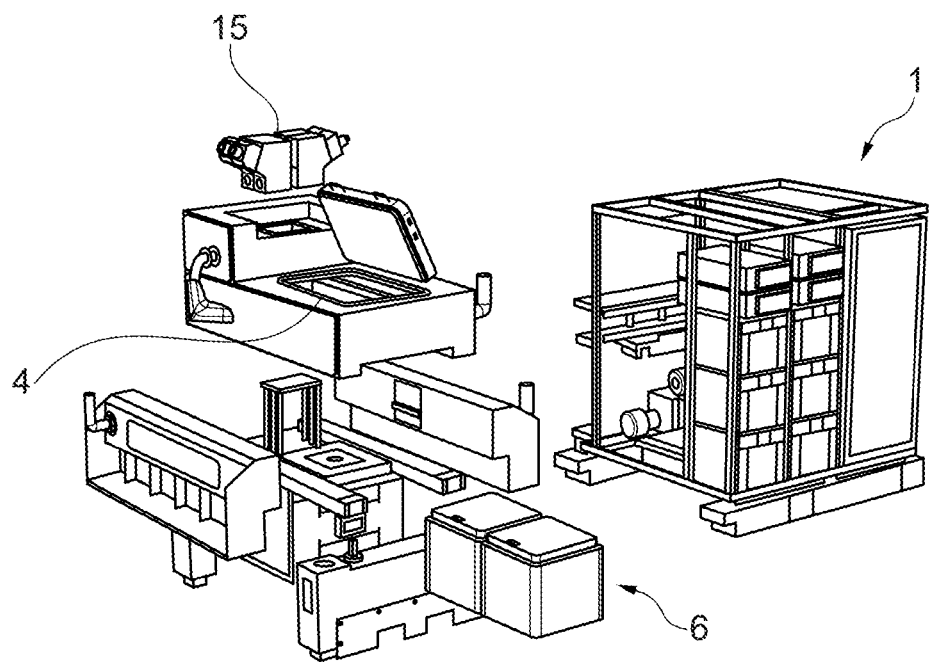
FIG. 14 shows an additive manufacturing system according to an embodiment of the present invention.

FIG. 14 shows the additive manufacturing system 1 with the optical bench 15. The optical bench 15 may be arranged opposite the building panel 72, i.e., on a top surface of the manufacturing system 1. The optical bench 15 includes an off-axis monitoring device 92 and an on-axis monitoring device 91. The off-axis monitoring device 92 is configured to monitor a heat distribution of an additively manufactured component layer and an application quality of the last applied powder layer. The on-axis monitoring device 91 is designed to determine a temperature of a powder bath on the currently manufactured component layer.

Figure 15A:
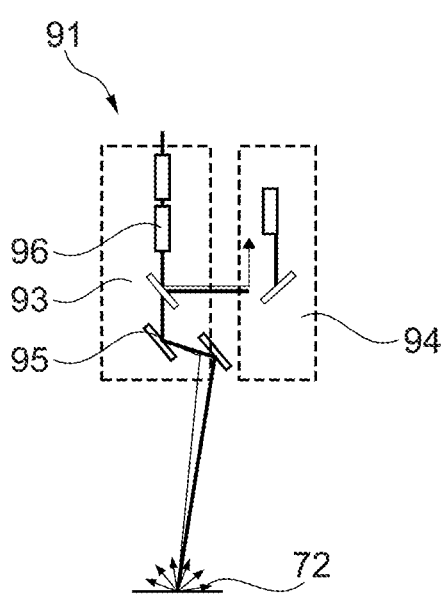
FIG. 15a, 15b show an optical bench of an additive manufacturing system according to an embodiment of the present invention.

As shown in FIG. 15a, the on-axis monitoring device 91 may include a ratio pyrometer, photodiodes, and/or a high-speed camera configured to determine the temperature of the powder bath. The building panel 72 within the building container 62 may contain the powder bath, such that the workpiece produced by the selective melting is surrounded by the powder.

Figure 15B:
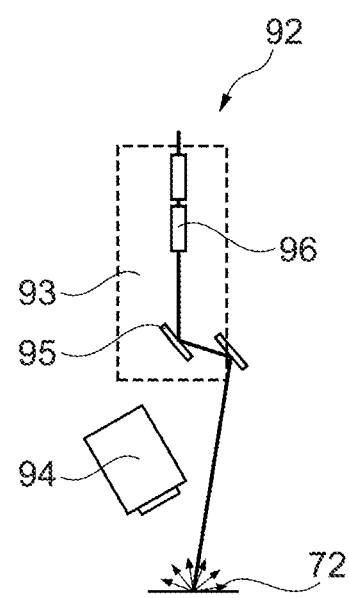

As shown in FIG. 15b, the off-axis monitoring device 92 may include two high resolution, high spectral bandwidth, multi-function cameras capable of detecting thermal process emissions during additive manufacturing using optical bandpass filters. A data capture of the camera images may be designed to integrate melt pool emission data occurring and captured during the exposure of a powder layer within one image. The result of this reception may correspond to a heat map of the currently built layer. From this heat map, there may be a possibility for dynamic adjustment of exposure sequences of areas to be scanned within a layer, adjustment of laser powers, or adjustment of scan speed within specific scan areas.

The on-axis monitoring device 91 and the off-axis monitoring device 92 each comprise a sensor unit 94 and an optical unit 93 comprising a scan head 95 and a collimator 96

Supplementally, it should be noted that "comprising" and "comprising" do not exclude other elements or steps. Further, it should be noted that features or steps that have been described with reference to any of the above embodiments may also be used in combination with other features or steps of other embodiments described above. Reference signs in the claims are not to be regarded as a limitation.

The invention claimed is:

1. An additive manufacturing system comprising
an operator area,
a loading area,
a building chamber comprising a building panel,
a lifting means, and
a transportable container unit,
wherein the operator area is configured to control the manufacturing system,
wherein the loading area is configured for loading the manufacturing system,
wherein the loading area comprises an interface for automated or manual insertion of the transportable container unit into the additive manufacturing system,
wherein the operator area is accessible from a first side of the manufacturing system, the loading area is accessible from a second side of the manufacturing system, and the first side is different from the second side,
wherein the operator area comprises an openable access to the building chamber, the openable access comprising a door and/or a window as entrance for an operator to the building chamber,
wherein the transportable container unit is insertable into the loading area and comprises a powder storage container and a building container,
wherein the powder storage container is configured for storing powder, and
the building container is configured for additive manufacturing of a workpiece, and
wherein the building chamber is couplable to the transportable container unit for applying the powder to the building panel, and wherein the lifting means is configured for lifting and docking the transportable container unit to a bottom of the building chamber, and
wherein the first side of the manufacturing system faces the second side of the manufacturing system.

2. The additive manufacturing system according to claim 1, wherein the transportable container unit further comprises a powder overflow container.

3. The additive manufacturing system according to claim 1, further comprising an optical bench, wherein the optical bench comprises an off-axis monitoring means and an on-axis monitoring means, and wherein the off-axis monitoring means is configured to monitor a heat distribution of an additively manufactured component layer of the workpiece and an application quality of a most recently applied powder layer, wherein the on-axis monitoring means is configured to detect a temperature of a powder bath on the currently manufactured component layer.

4. The additive manufacturing system according to claim 1, wherein the powder storage container and the building container each comprise a lid, wherein the lid is configured to seal the respective container, and wherein the lid further comprises a protrusion for gripping the lid.

5. The additive manufacturing system according to claim 1, wherein the operator area comprises a monitor for monitoring and/or controlling data and/or functions of the manufacturing system.

6. The additive manufacturing system according to claim 1, wherein the powder storage container and the building container each comprise a base plate and a lifting rod, wherein the lifting rod is configured to lift the base plate within the respective container.

7. The additive manufacturing system according to claim 6, wherein the base plate comprises at least one cooling line, and wherein the cooling line is coupled to an inlet and an outlet of a cooling medium through the lifting rod.

8. The additive manufacturing system according to claim 6, wherein the building container comprises at least one fixing member comprising a spring-biased bolt and a clamping ball, and wherein during a container replacement the clamping ball is clampable to the building panel by the spring-biased bolt.

9. The additive manufacturing system according to claim 6, wherein the building container further comprises a heating plate, wherein the heating plate is disposed between the building panel and the base plate, and wherein the heating plate is configured to heat the building panel.

10. The additive manufacturing system according to claim 9, further comprising a shielding gas inlet and a shielding gas outlet, wherein the shielding gas inlet and the shielding gas outlet are arranged to generate a shielding gas flow relative to the building panel.

11. The additive manufacturing system according to claim 9, wherein the heating plate comprises heating elements and an insulating layer, wherein the insulating layer is disposed below the heating elements for insulation in the direction of the base plate.

12. The additive manufacturing system according to claim 1, wherein the bottom of the building chamber comprises a sealing interface, and wherein the sealing interface is configured to positively and gas-tightly couple the transportable container unit to the building chamber.

13. The additive manufacturing system according to claim 12, wherein the sealing interface includes a gap for collecting a powder residue, and wherein the gap is coupled to a cleaning nozzle for blowing out the powder residue.

* * * * *